J. FALLOWS.

Assignor, by mesne assignments, to H. WHITNEY & E. D. GOODRICH.

Sheet-Metal Spoon.

No. 8,873. Reissued Aug. 26, 1879.

WITNESSES.

A. J. Oettinger

A. F. Raymond 2d

Elijah D. Goodrich & Horace Whitney assignees of James Fallows by Atty Thos. W. Clarke } INVENTOR

N. PETERS, PHOTO-LITHOGRAPHER, WASHINGTON D. C.

UNITED STATES PATENT OFFICE.

HORACE WHITNEY AND ELIJAH D. GOODRICH, OF CAMBRIDGE, MASS., ASSIGNEES, BY MESNE ASSIGNMENTS, OF JAMES FALLOWS.

IMPROVEMENT IN SHEET-METAL SPOONS.

Specification forming part of Letters Patent No. 48,164, dated June 13, 1865; Reissue No. 8,873, dated August 26, 1879; application filed November 18, 1878.

*To all whom it may concern:*

Be it known that JAMES FALLOWS, of the city of Philadelphia, in the State of Pennsylvania, did invent a new and useful Improvement in Sheet-Metal Spoons, in which invention the principal novelty consisted in the improved handle and its attachment to its bowl; and we do hereby declare that the following is a full, clear, and exact description of the same, reference being had to the accompanying drawings, making a part of this specification, in which—

Figure 1:
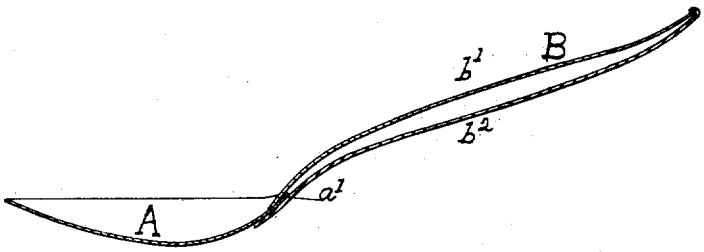
Figure 2:
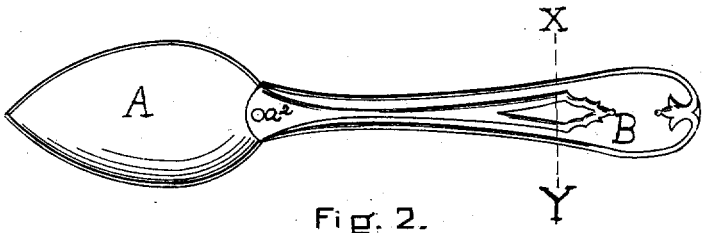
Figure 3:
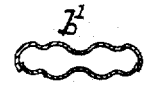

Figure 1 is a vertical longitudinal section, and Fig. 2 a top view, of the said improvement, Fig. 3 being a transverse section in the dotted line *x y* of Fig. 2, and like letters of reference indicating the same parts when in the different figures.

The nature of the invention consists, substantially as hereinafter described, in making the sheet-metal handle of two distinct pieces of comparatively thin sheet-iron or tin-plate, by lapping the edges of the one piece over upon the edges of the other, attaching bowl thereto by means of a shank on the bowl inserted between the shells of the handle and there secured, and, finally, dipping the whole together into, or passing it through, melted tin or alloy, so as to cement all the joints securely together at one operation, and at the same time thoroughly cover the whole exterior surface of the article with a bright coat of the tin or alloy.

In the drawings, A is the bowl of a spoon, and B the handle.

In constructing the invention we take comparatively thin tin-plate and cut out the blanks for the handle B, and compress them between suitable dies, so as to give them any curved and ornamental form that may be desired, and at the same time turn the edges of the wider or upper-side blank, $b^1$, inward to an angle of about ninety degrees, except at the bowl end. We then adjust the two distinct pieces of sheet metal or blanks $b^1$ and $b^2$ together, with their general convex or raised sides outward, and press the turned edges of the blank $b^1$ closely down over the edge of the other, $b^2$, as represented in Fig. 3, thus securing them tightly and permanently together, and leaving a hollow space between.

The blank for the bowl A we usually cut out of thicker sheet metal. It has a short projection or shank, $a^1$, left on its inner end. It is stamped or formed up between dies in the usual manner, and then attached to the hollow handle B by inserting its shank $a^1$ into the cavity left open at the inner end of the handle B, and the whole together then pressed between dies made for the purpose of accurately closing the joints and giving the proper shape or set. It is then taken out and dipped into the melted tin or alloy, thus cementing all the joints or seams closely, and covering the whole with a brilliant coat of the metal.

For spoons or forks intended to be used in boiling oils or fats, a small rivet, $a^2$, is secured through the bowl and handles, as indicated in Fig. 2.

It will be readily understood that the peculiar form and construction of the handle described gives it great stiffness, and hence allows it to be made of thinner tin-plate than is required for the bowl, and allowing the handle to be more sharply and accurately ornamented by stamping in dies, and the parts being all made of sheet-iron or tin-plate, and fixed permanently together before being dipped, that the latter operation can be performed without any danger of destroying or separating the said parts, which is a very important feature, because the stamping process deadens and impairs the brightness of the surface of tin-plate.

We are aware that hollow handles of sheet metal for knives and forks are old and well known; but having generally been made of sheet-zinc or soft alloy blanks, abutted and then soldered together at their edges by a soldering-tool, they could not be subjected to the rapidly-finishing process of dipping herein described.

We are aware, also, that spoons and spoon-handles have each been made before of a single piece of tin or sheet-iron plate. Therefore I do not desire to claim, broadly, spoons or forks having hollow sheet-metal handles; nor, broadly, the making of spoon or fork handles of tin-plate or sheet-iron.

Having thus fully described the invention, we claim and desire to secure by Letters Patent—

1. A sheet-metal handle adapted to be united by compression or riveting to the ear of a bowl inserted between the parts of the handle, composed of two pieces of sheet metal whose edges are lapped closely upon each other, substantially as described.

2. A sheet-metal handle composed of two pieces of sheet metal whose longitudinal edges are closely lapped upon each other, substantially as described.

3. A sheet-metal handle composed of two pieces of sheet metal whose longitudinal edges are closely lapped upon each other, and whose ends are united to a bowl, and then the parts so united are immersed in molten metal, substantially as described.

HORACE WHITNEY,
ELIJAH D. GOODRICH,
*Assignees.*

Witnesses:
F. F. RAYMOND, 2d,
GEO. F. WALKER.